United States Patent [19]

Belart

[11] Patent Number: 4,641,891
[45] Date of Patent: Feb. 10, 1987

[54] HYDRAULIC SERVO VEHICLE BRAKE
[75] Inventor: Juan Belart, Walldorf, Fed. Rep. of Germany
[73] Assignee: Alfred Teves GmbH, Frankfurt am Main, Fed. Rep. of Germany
[21] Appl. No.: 747,021
[22] Filed: Jun. 20, 1985
[30] Foreign Application Priority Data
Jun. 22, 1984 [DE] Fed. Rep. of Germany ....... 3423030
[51] Int. Cl.$^4$ .......................... B60T 8/02; B60T 11/16; B60T 13/12
[52] U.S. Cl. ........................................ 303/10; 188/345; 188/347; 303/56; 303/114; 303/119
[58] Field of Search ........ 188/347, 348, 345, 355–360, 188/181; 303/114, 52, 10–12, 6 R, 6 A, 100, 92, 113, 119, 116, 117, 118, 56, 84 R; 60/545, 547.1, 548, 554, 555, 579, 581–582, 591

[56] References Cited
U.S. PATENT DOCUMENTS

| | | | |
|---|---|---|---|
| 4,225,022 | 9/1980 | Belart | 188/347 X |
| 4,251,114 | 2/1981 | Belart | 303/52 X |
| 4,440,454 | 4/1984 | Belart et al. | 188/345 X |
| 4,467,605 | 8/1984 | Smith | 188/347 X |

Primary Examiner—Douglas C. Butler
Attorney, Agent, or Firm—James B. Raden; William J. Michals

[57] ABSTRACT

A hydraulic servo vehicle brake with a tandem master cylinder wherein the first master piston (24) is provided with a cylindrical axial bore toward the piston pressure chamber (76). A second master piston (80) extending to the master cylinder bottom (79) is tightly slidably arranged in the axial bore. A non-return valve (23) provided as a sealing cup is provided between the second master piston (80) and the annular portion (24''') of the first master piston (24). Between that portion of the second master piston (80) which projects from the axial bore (78) and the master cylinder (11), an annular chamber (22) is provided which is linked with a three-position two-way valve (33) controlled by the controlled pressure. With no application of controlled pressure, the three-position two-way valve (33) links the annular chamber (22) to the fluid reservoir (27). In the presence of a slight controlled pressure, the valve (33) interrupts the link. Above a certain level of controlled pressure, the valve (33) opens again and re-establishes the link to the fluid reservoir (27).

7 Claims, 4 Drawing Figures

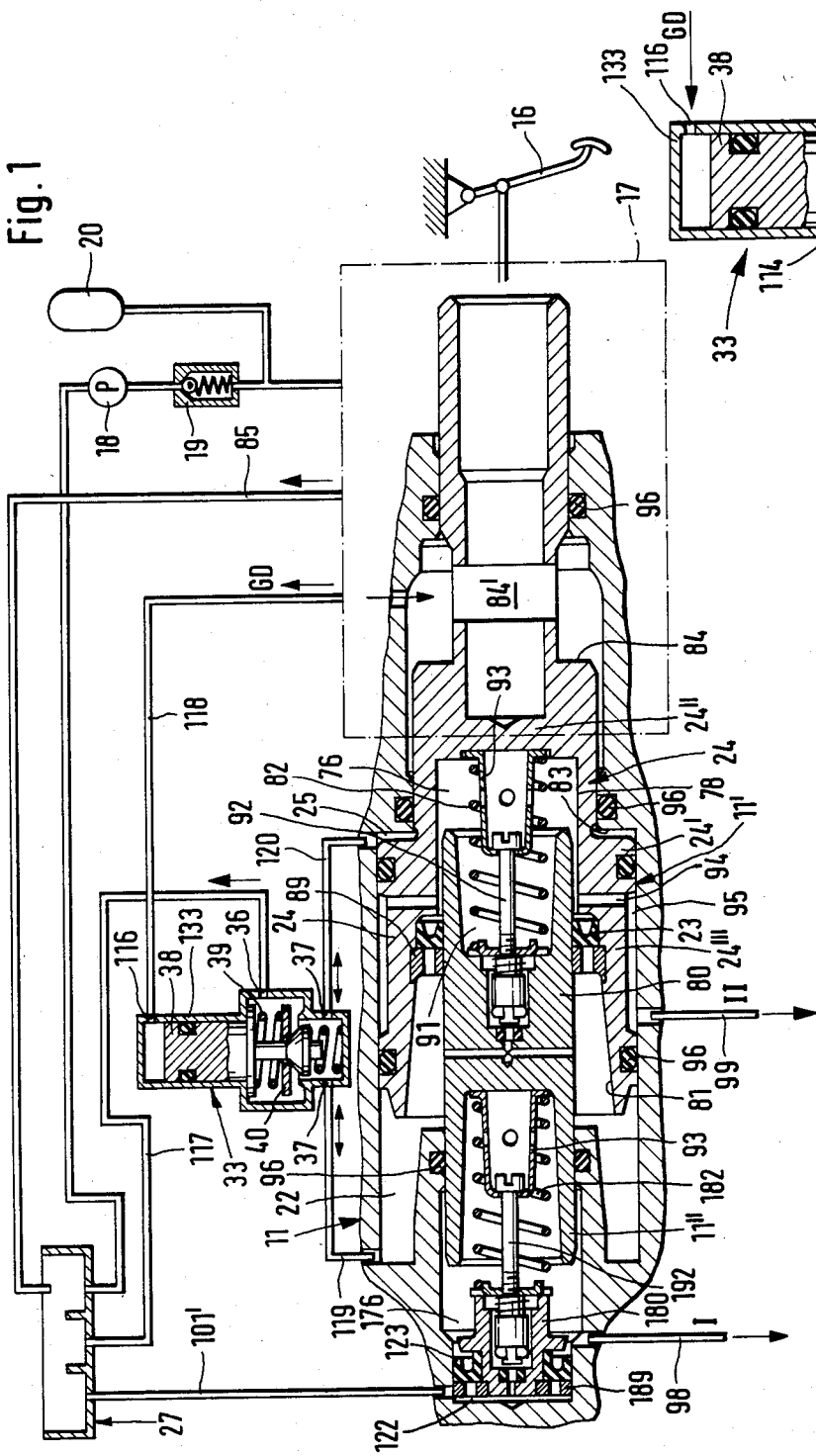

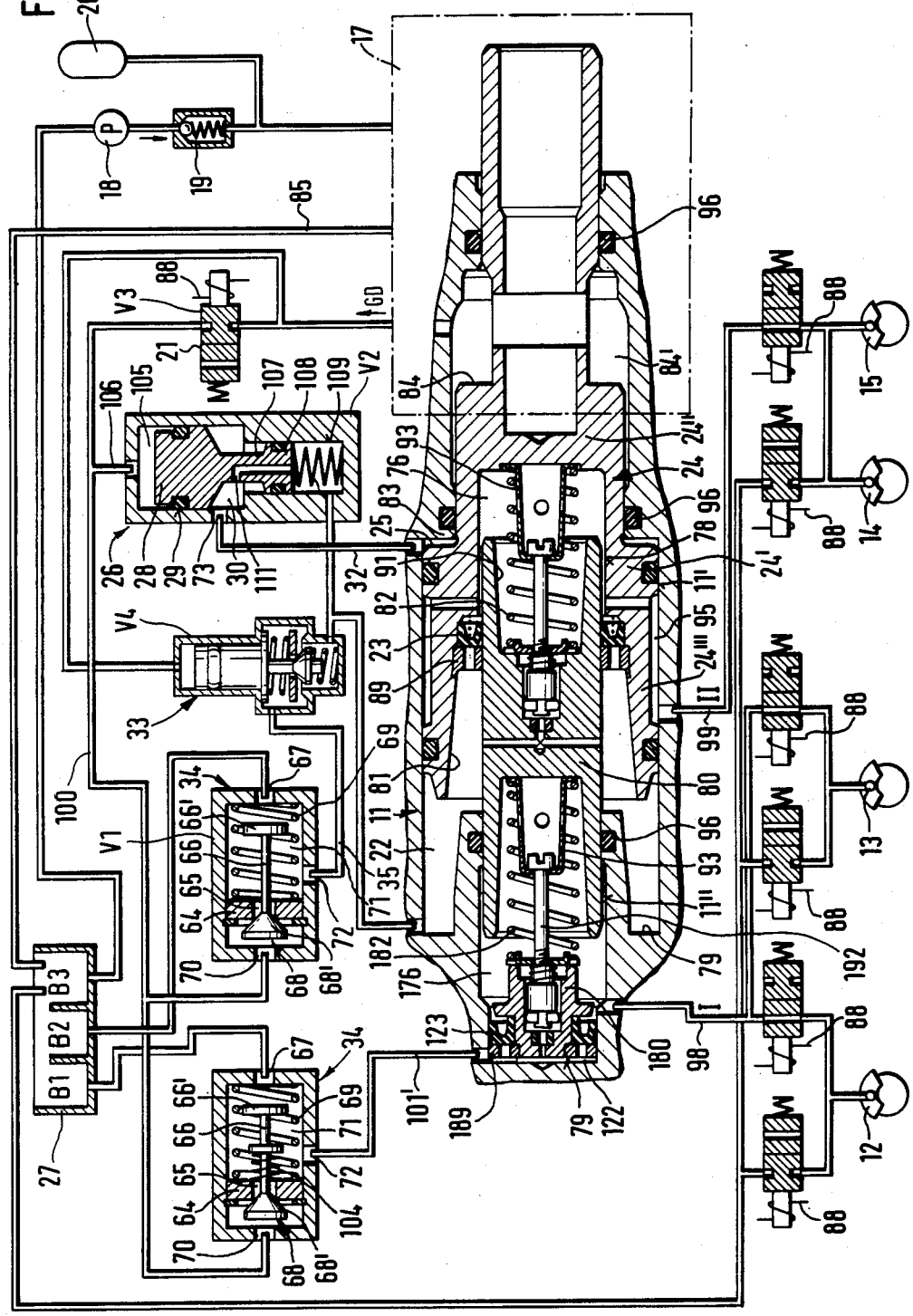

HYDRAULIC SERVO VEHICLE BRAKE

BACKGROUND OF THE INVENTION

The invention relates to a hydraulic servo vehicle brake with a pedal-actuated tandem master cylinder having two master pistons, with wheel cylinders linked thereto through at least one brake circuit. A brake application valve is arranged between the pedal and the first master piston which, on actuation by the brake pedal, applies pressure medium supplied by a hydraulic pump connected with a fluid reservoir to the first master piston in a controlled manner and directly to a brake circuit to furnish a controlled pressure.

A problem in such vehicle brakes is that a relatively large pedal travel is required to apply the brake shoes to the brake drum or brake disc because considerable quantities of pressure medium must be conveyed from the master cylinder to the wheel cylinders in this phase of operation. It is therefore an object of the present invention to create a vehicle brake of the type described in which the pedal travel prior to application of the brake shoes to the brake drum or brake disc takes place is reduced to a considerable extent.

SUMMARY OF THE INVENTION

This object is achieved according to the present invention in that the first master piston is provided with a cylindrical axial bore toward the piston pressure chamber within which axial bore a second master piston extending to the master cylinder bottom is tightly slidably arranged. A non-return valve provided in the shape of a sealing cup is provided between the second master piston and the annular portion of the piston. The annular chamber existing between that portion of the second master piston which projects from the axial bore and the master cylinder is linked with a three-position two-way valve having an inlet and an outlet which is controlled by the controlled pressure by way of a control inlet. With no application of controlled pressure, the valve links the annular chamber to the fluid reservoir and interrupts that link in the presence of a slight first controlled pressure of approximately 1 bar. The locking condition is maintained until application of the brake shoes takes place as long as the controlled pressure is still relatively low and amounts on the order of up to approximately 7 bar, and which opens again by the effect of an increased second controlled pressure exceeding approximately 7 bar.

As a result of this configuration, a pressure is built up in the annular chamber located behind the first master piston during the closing phase of the three-position two-way valve, as a result the non-return valve provided at the master piston opens and pressure medium flows from the annular chamber into the piston pressure chamber and from there forth to the wheel cylinders. Because of the pressure balance taking place in this way, the second master piston, when arranged slidingly within a secondary cylinder of a tandem master cylinder, will slide forward a little faster than the first master piston, that is, at identical pedal travel. That means that filling of the wheel cylinders until the brake shoes are applied will take place more quickly, and the pedal travel until application of the brake shoes is accomplished is significantly reduced. Upon the application of the brake shoes, the three-position two-way valve will then open again, and the brake will continue to operate the annular chamber being linked to the fluid reservoir.

In a first embodiment the outlet of the three-position two-way valve is directly connected with the fluid reservoir. The invention can be applied to a vehicle brake with a wheel slip-brake control unit which, in the event of incipient slip of one or several vehicle wheels, automatically reduces the brake power at the relevant vehicle wheels to a value just enabling the wheels to rotate and which comprises a switching valve. The control unit is also subjected to the controlled pressure and is normally closed and opens at incipient slip of one or several vehicle wheels in order to apply the controlled pressure to the master cylinder from where the pressure medium is conveyed, through a valve provided at the first master piston, to the pressure chambers positioned behind the master pistons, to which pressure chambers the brake circuits are linked. In this case, according to the invention, the outlet of the three-position two-way valve is connected with a change-over valve through a hydraulic line upon which the switching acts and which links the three-position two-way valve to the fluid reservoir when the switching valve is closed and is changed over by the controlled pressure when the switching valve is open and applies the controlled pressure, through the change-over valve, to the outlet of the three-position two-way valve.

In this configuration, the annular chamber is, therefore, utilized to provide dual functions. That is, on one hand for the purpose of avoiding the reflux of pressure medium from the annular chamber into the fluid reservoir when the brake shoes are being applied and for the purpose of conveying the pressure medium from the annular chamber into the pressure chamber of the first master piston. On the other hand, the annular chamber is utilized for the purpose of conveying the pressure medium directly supplied by the pump, past the sealing cup-shaped non-return valve, to the wheel cylinders in the event of a wheel slip.

In order to simply avoid a return movement of the first master piston at an incipient wheel slip, according to another embodiment of the invention, the first master piston succeeding the brake application valve and the master cylinder are extended in a stepped configuration in the direction of the associated piston pressure chamber. The pedal-retaining annular chamber so formed is, under normal conditions, linked to the inlet of the three-position two-way valve through a pedal-retaining valve controlled by the switching valve and is hut off from the atmosphere by the pedal-retaining valve in the event of a wheel slip.

In an advantageous embodiment the three-position two-way valve is furnished with an actuating piston which, through a first spring, acts upon a closing plate in the direction of a closure and, through a push rod, upon a valve cone positioned in an opening of the closing plate in the direction of opening, the inlet being provided on the side of the valve cone and the outlet on the side of the closing plate. In this context, the actuating piston with the spring, the closing plate, the push rod and the valve cone are preloaded in the direction of opening by a weak second spring determining the slight first pressure and that the difference of the forces of the second and first springs corresponds to the second pressure.

In a further embodiment the change-over valve is provided with a piston which is furnished with an opening and is subjected to the force of a return spring contrasting the pressure applied to that piston and in which a closing push rod with a closing plate is arranged, which is opposed by an outlet port and closes that outlet port when in abutment therewith. The closing push rod interacts, with its other end, with a valve closing the opening in the piston, with the interaction being such that upon the closure of the outlet port, the closing push rod opens the valve when the piston moves further, with the inlet port being connected to the controlled pressure, the outlet port to the fluid reservoir, and the chamber between the piston and the outlet port, through a connecting port, and to the outlet of the three-position valve. The present invention is also applicable to a vehicle brake with a simplex-type master cylinder.

BRIEF DESCRIPTION OF THE DRAWING

The invention is described with reference to the drawing in which:

FIG. 1 is a schematic representation of a vehicle brake with a tandem master cylinder shown in a part-sectioned side view and with further components in accordance with the present invention;

FIG. 2 is an up-sided side view, partly in cross-section, of the three-position two-way valve 33 according to FIG. 1;

FIG. 4 shows an embodiment similar to that in FIG. 3, in which two brake circuits are connected to the two master-cylinder pressure chambers.

DETAILED DESCRIPTION

Figure 3:
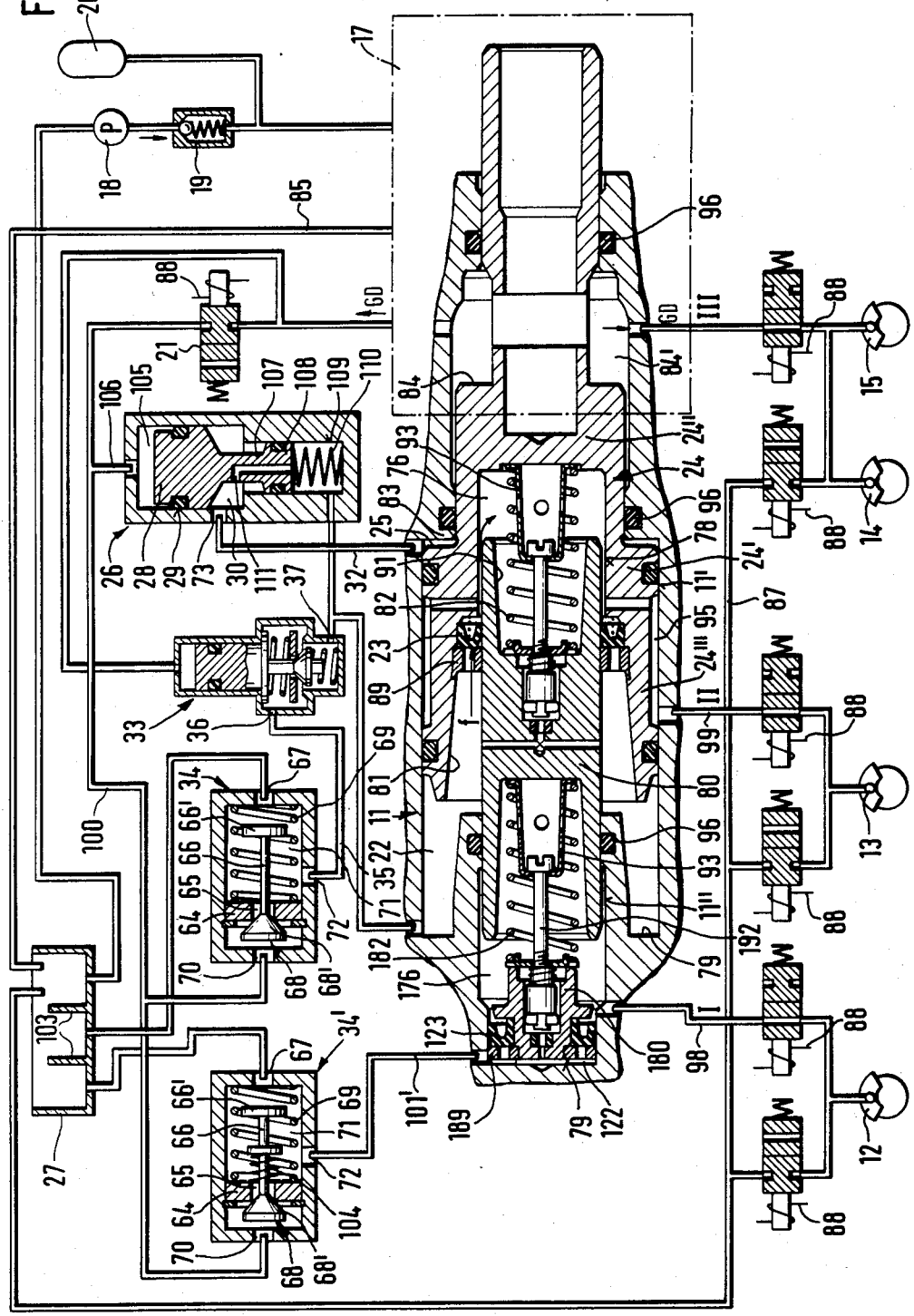
FIG. 3 is a part-sectioned side view and schematic representation of an embodiment of an inventive vehicle brake with three brake circuits and provided with a wheel-slip brake control unit.

In all Figures, like reference numerals and letters designate corresponding elements. According to FIG. 1, in a tandem master cylinder 11 provided with an outwardly projecting annular step 83, a master piston 24 of a corresponding outwardly projecting stepped configuration is axially slidably accommodated. The master piston is, therefore, formed with a stepped extension 24' and the master cylinder 11 with a stepped extension 11'.

Between the brake pedal 16 outlined in dashed lines and the master piston 24, a brake application valve 17 outlined only by a dash-dotted frame is provided which, through a non-return valve 19, is subjected to the pressure supplied by a pump 18 and by an accumulator 20, respectively, which is arranged in parallel. On operation of the brake pedal 16, the brake application valve 17 applies in a controlled manner a controlled pressure GD generated within the controlled pressure chamber 84' to the front face 84 of the master piston 24.

Seals 96 take care of the necessary sealing between the individual pressure chambers 22, 76, 84'; 176 to be separated from one another. The brake application valve 17 is, in addition, linked, through a hydraulic line 85, to the fluid reservoir 27 in order to recycle to the fluid reservoir 27 of the pressure medium displaced durihng release of the brake.

The design of the brake application valve 17 and of the brake power booster linked to it may be as described in the German patent application Nos. 3,040,561 and 3,317,636.

The master piston 24 is provided, on the side facing away from the pedal 16, with a cylindrical axial bore 78 which is separated from the front face 84 by the piston bottom 24". In this manner, the master piston 24 is furnished with an annular piston 24''' into which a second master piston 80 with a constant external diameter extends from the master cylinder bottom 79.

The second master piston 80 is furnished, at its front end, with an axial recess 91 in which a return spring 82 is arranged that extends up to the bottom 24" of the master piston 24. The recess 91 accommodates, in addition, an axial stop bolt 92 which is fastened to the second master piston 80 at one end and, with its head provided at the other end, makes catch behind a stop bushing 93 being fixed to the bottom 24" of the master piston 24. The return motion of the master piston 24 caused by the return spring 82 is limited in this manner.

In the range of its bottom 79, the tandem master cylinder 11 is furnished with a secondary cylinder 11''. The second master piston 80 is not only axially slidable within the first master piston 24, but extends, with its rear end range, into the secondary cylinder 11'' which is configurated at the bottom 79 and which, on its part, projects in the shape of a sleeve into an annular chamber 22 surrounding the second master piston 80 and whose pressure chamber 176 is linked, through a hydraulic line 98, with the brake circuit 1. A line 101' leads, moreover, from the fluid reservoir 27 to an annular chamber 122 in the rearmost part of the master cylinder 11, which annular chamber 122 is linked, through an apertured ring 189 and a non-return valve 123 configurated in the shape of a sealing cup, to the pressure chamber 176 which is subjected to the pressure exerted by the second master piston 80. In analogy to the return spring 82 and to the stop device 92, 93 of the first master piston 24, a return spring 182 and another stop device 192, 193 are provided also between the second master piston 80 and the cylindrical supporting element 180 which is fastened to the master cylinder bottom 79 and at which the apertured ring 189 and the non-return valve 123 are configurated.

An external annular chamber 95 at the annular portion 24'''' of the first master piston 24 is connected, through the hydraulic line 99, with the brake circuit II.

A sealing cup serving as a non-return valve 23 is arranged at the inside wall of the annular portion 24''' and is sealingly abutted against the outside wall of the second master piston 80 and axially bounded at its rear by an apertured ring 89. From the apertured ring 89, the annular portion 24''' extends an additional length in the direction of the master cylinder bottom 79, a recess 81 being, however, provided radially internally through which the apertured ring 89 is linked to the annular chamber 22 surrounding the second master piston 80, which annular chamber 22 is connected, in its turn, to a three-position two-way valve 33 still to be described, through a hydraulic line 119.

Since the annular cup is simultaneously configured as a non-returned valve 23, it opens up a path of flow when the pressure in the annular chamber 22 is higher than the pressure in the pressure chamber 76. Upstream of the non-return valve 23 formed by the sealing cup, an annular gap 90 is located between the second master piston 80 and the annular piston 24''' in order to render it possible to establish a continuous link f for the pressure medium between the annular chamber 22 and the pressure chamber 76.

Radial bores 94 branch off from the annular gap 90 which radially externally end up in the radially narrow annular chamber 95 formed between the master piston 24 and the master cylinder 11 and extending axially between two seals 96.

As per FIGS. 1 and 2, the three-position two-way valve 33 comprises an actuating piston 38 being accommodated in a cylinder 133 and coupled, through a push rod 41, to a valve cone 43 which extends through an opening 42 in a closing plate 40. Between a stop plate 114 of the actuating piston 38 and the closing plate 40, there extends a first spring 39 which forces the closing plate 40 against the valve cone 43 and which exerts a force of, for example, 2.5 kp.

Between the bottom of the cylinder 133 and the lower side of the valve cone 43, a relatively weak second spring 44 extends which preloads the structural unit composed of the piston 38, the valve cone 43 and the closing plate 40 in upward direction with a force of, for example 0.7 kp. The closing plate 40 interacts with an annular seat 115.

In its upper part, the cylinder 133 is furnished with a connection 116 for the controlled pressure GD and in its lower part, in the chamber accommodating the weak spring 44, with one or two inlets 37. From the chamber receiving the first spring 39, an outlet 36 branches off laterally which is linked to the fluid reservoir 27 through a hydraulic line 117 according to FIG. 1. The pressure inlet 116 is connected, through a hydraulic line 118, to the brake application valve 17 and is subjected by the latter to the controlled pressure GD. From the one inlet 37, a hydraulic line 119 leads to the annular chamber 22, while from the other inlet 37, a hydraulic line 120 goes to the annular chamber 25 existing at the annular step 83.

The vehicle brake described works as follows:

When the brake pedal 16 is depressed, initially, that is, still before application of the brake shoes, a relatively low controlled pressure will be generated affecting the piston 38 of the three-position two-way valve 33 initially only at such an extent that the weak spring 44 is compressed and the closing plate 40 is applied to the valve seat 115, as a result whereof the inlets 37 are separated from the fluid reservoir 27. Thereupon, in the event of a further forward slide of the master piston 24, the pressure in the annular chamber 22 will sharply rise, so that pressure medium may flow, through the apertured ring 89 and past the sealing cup 23, directly into the pressure chamber 76 of the pressure piston 24. This means that an additional volume of pressure medium comes to exist within the pressure chamber 76 without any extension of the pedal travel. In consequence of that increase of volume, not only the brake shoes of the associated wheel cylinders will be applied more quickly, but the second master piston 80 will also slide forward at a higher speed than the primary master piston 24. In this way, also the brake shoes of the brake circuit I which is subjected to the pressure exerted by the second master piston 80 will come to be applied more quickly at an identical pedal travel.

The hydraulic line 120 is required in order to convey pressure medium in this operating condition from the annular chamber 22 into the annular chamber 25 which is going to extend. The absorption of pressure medium on the part of the annular chamber 25, is, however, limited due to the cross-sectional area of the annular chamber 25 being smaller as compared to that of the annular chamber 22, so that sufficient pressure medium will still be available to fill the pressure chamber 76.

Subsequently, when all brake shoes are applied to the brake drum or brake disc, the controlled pressure GD will rise, for example, to a value beyond 7 bar, with the consequence that the piston 38 of the three-position two-way valve 33 is shifted still further compressing the stronger spring 39, with the valve cone 43 being lifted off from the edge of the opening 42 of the closing plate 40, so that the link between the inlets 37 and the fluid reservoir 27 through the connection 36 will now be established again. The annular chamber 22 is now linked again to the fluid reservoir 27, and the valve formed by the sealing cup 23 closes.

In addition to the vehicle brake according to FIGS. 1 and 2, the embodiment shown in FIG. 3 is furnished with a wheel slip-brake control unit. Moreover, a third rear-axle brake circuit III directly linked to the controlled pressure GD is provided, whereas the pressure chambers 76, 176 are connected to one each front wheel cylinder 12, 13. The components provided in addition to the embodiment according to FIGS. 1 and 2 will be described in the following:

The controlled pressure GD existing in the controlled pressure chamber 84' and brought to bear on the front face 84 of the master piston 24 is conveyed, through a further hyraulic line 86, also to a brake circuit III by way of a normally open closing valve SO (meaning a valve, open when de-energized) of the two rear-axle wheel cylinders 14, 15 which are connected in parallel. From the rear-axle wheel cylinders 14, 15, a further hydraulic line 87 leads, by way of a normally closed opening valve SG (meaning a valve, closed when de-energized), back to the fluid reservoir 27.

The closing valve SO and the opening valve SG are controlled by a wheel slip-brake control unit not shown in the drawing, and this is outlined by control lines 88 illustrated in dashed lines. In the event of a slippage at the rear wheels deteced by a sensor, first the closing valve SO closes in order to limit the pressure in the wheel cylinders 14, 15. If this is not yet sufficient to avoid a wheel slip, the opening valve SG will open in addition. Generally, a cyclic opening and closing of the valves SO and SG will take place at the moment of an incipient wheel slip, as a result whereof a determined volume of pressure medium is consumed which must be made up for by the pump 18.

The method of functioning of the closing and opening valves SO and SG, respectively at the front wheel cylinders 12, 13 which are associated with the brake circuits I and II, respectively is analogous to the method of functioning described above of the valves with identical reference letters at the wheel cylinders 14, 15 of the rear axle.

Furthermore, the controlled pressure GD is applied to a switching valve 21 which normally assumes the closed position as shown in FIG. 1. Also the switching valve 21 is connected, through a control line 88', with the wheel slip-brake control unit not shown in the drawing, precisely in such a manner that it is commutated into the open position as soon as a wheel slippage is detected at one of the front wheels interacting with the wheel cylinders 12, 13.

In this way, the controlled pressure GD is applied, through the switching valve 21, a hydraulic line 100, a change-over valve 34 and the annular chamber 22, to the non-return valve 23 formed by the sealing cup which is in linkage with the pressure chamber 76 through the annular gap 90. The non-return valve 23 opens as soon as the pressure in the annular chamber 22 exceeds the pressure in the pressure chamber 76, as a result whereof pressure medium may then flow through the switching valve 21 and the non-return valve 23, into the pressure chamber 76 and from there forth to the wheel cylinder 13 in the brake circuit II, as far as this is necessary in case of excessive pressure medium consumption in the event of a wheel slippage.

Since due to the pressure build-up in the pressure chamber 76 upon the commutation of the switching valve 21 and upon the opening of the non-return valve 23 a restoring force is exerted on the master piston 24 which is higher than the force in the direction of forward slide brought to bear on it through the front face 84, the pedal-retaining annular chamber 25 is provided at the annular step 83 of the master cylinder 11, which pedal-retaining annular chamber 25 is linked, through a hydraulic line 32, to a pedal-retaining valve 26. The pedal-retaining valve 26 contains a piston slide element 28 sliding within a cylinder 29, the pressure side 105 of which piston slide element 28 is linked, through a hydraulic line 106, to the hydraulic line 100 which is subjected to the controlled pressure GD when the switching valve 21 is open. At its end facing away from the pressure chamber 105, the piston slide element 28 is formed with a reduced-diameter intermediate section 107 which is succeeded by a sliding piston 108 having a diameter sized between that of the intermediate section 107 and that of the piston slide element 28 and being adapted to slide within a cylinder section 109 having a correspondingly reduced diameter. A return spring 110 preloads the piston slide element 28 in the direction in contrast to the pressure applied to it in order to make sure that without pressure being applied to it, the piston slide element 28 always assumes the position shown in FIG. 3.

Around the intermediate section 107, an annular cylinder chamber 30 is configurated at which two connections 73, 74 are provided in an axially offset position. Between the annular cylinder chamber 30 and the chamber accommodating the spring 110, there is arranged a pressure balancing line 111 which is provided in the intermediate section 107 and in the sliding piston 108.

The hydraulic line 32 is linked to the connection 72, whereas from the connection 74, a further hydraulic line 31 leads to the inlet 37 of the three-position two-way valve 33.

The change-over valve 34 contains an axially slidable piston 64 with a central opening 65 through which a closing push rod 66 extends which at its end facing away from the opening 65, bears a closing plate 66' to close an outlet port 67 in a fluid-tight manner when it comes to rest on the outlet port 67.

The outlet port 67 is linked, through a hydraulic line 102, with the fluid reservoir which is subdivided into three compartments for safety reasons between which slightly lower walls 103 are arranged.

At the end of the closing push rod 66 facing away from the outlet port 67, there is arranged a valve 68 which is constituted by a valve cone 68' and the edge of the opening 65 in FIG. 3. A spring 69 preloads the piston 64 in the direction of the pressure inlet port 70 linked to the switching valve 21, whereas another spring 104 forces the valve cone 68' against the edge of the opening 65 in the piston 64.

The spring 69 is dimensioned such that upon commutation of the switching valve 21, the controlled pressure GD slides the piston 64 in forward direction to the right as viewed in FIG. 3 until the closing plate 66' closes the outlet port 67. The piston then moves further to the right compressing the spring 104, as a result whereof the valve 68 opens and a free path of flow is established in axial direction between the edge of the opening 65 and the closing push rod 66 through which the hydraulic line 100 and the hydraulic line 35 branching off from the chamber 71 between the piston 64 and the outlet port 67 are linked to each other. The controlled pressure now comes to be applied to the annular chamber 22 when the three-position two-way valve 33 is open.

If pressure medium is now consumed at the wheel cylinders 12, 13, then the pump 18 and the accumulator 20, respectively will supply the necessary quantity of make-up pressure medium to the piston pressure chamber 76 and, thus, to the wheel cylinders 12, 13 through the annular chamber 22 along the line f in FIG. 3.

That means that the change-over valve 34 serves the purpose to link the annular chamber 22 to the fluid reservoir 27 in normal operation of the brake without incipient wheel slip, but to interrupt that link and to connect the annular chamber 22 with the switching valve 21 instead when the switching valve 21 has changed over the change-over valve 34 into its other switching position on account of an incipient wheel slip.

In other words, the change-over valve 34 takes cares that the pressure medium contained in the annular chamber 22 is normally flashed into the fluid reservoir 27 without pressure build-up and can freely flow back from the fluid reservoir 27 when the brake is being operated. The annular chamber 22 received its essential function only upon commutation of the switching valve 21 in case of incipient wheel slippage.

A change-over valve 34' having an entirely analogous configuration is inserted also in the hydraulic line 101' leading to the annular chamber 122 in order to convey pressure medium directly into the pressure chamber 176 through the switching valve 21 and the non-return valve 123 in the event of an incipient wheel slip at the front wheel cylinder 12 and in order to allow a reaspiration of brake fluid from the fluid reservoir 27 through the non-return valve 123 in the normal case.

The method of operation of the servo vehicle brake according to FIG. 3 is as follows:

When the brake pedal 16 is depressed, the controlled pressure GD will be applied directly to the rear-axle brake circuit III with the wheel cylinders 14, 15, while the front-axle wheel cylinders 12, 13 will be subjected to the pressure exerted by the master pistons 24, 80 when they slide in forward direction. The forward side of the master piston 24 takes place by the action of the superimposed forces of the pedal 16 and of the controlled pressure GD on the front face 84.

In the event of an incipient wheel slip at one of the rear wheels during a braking action, the opening and closing valves SO and SG, respectively will be caused, through the control lines 88, to close and to open, respectively in a cyclic manner contrasting the wheel slip. The pressure medium consumed by this procedure will be made up directly by the pump 18 and the accumulator 20, respectively through the hydraulic line 86, so that no problems will exist in this instance.

If, however, a slippage occurs at one of the front wheels, then the wheel slip-brake control unit will switch not only the closing and opening valves SO and SG, respectively provided at the wheel cylinders 12, 13 but also the switching valve 21 into the open position, through the control line 88'. In this way, the controlled pressure GD will be applied to the non-return valves 23, 123 through the hydraulic line 100 and the change-over valves 34, 34', and the pressure chambers 76, 176 will be supplied with pressure medium directly from the pump 18.

Furthermore, also the piston slide element 28 is subjected to the controlled pressure GD from its pressure side 105 through the hydraulic line 106, so that it will be shifted into the lower position as viewed in FIG. 3, with the spring 110 being compressed, in which position it will shut off the connection 73, as a result whereof the pedal-retaining annular chamber 25 will also be separated from the fluid reservoir 27. In this manner, the piston 24 is prevented from being moved back when the non-return valve 23 opens.

Pressure medium will, thus, be supplied at sufficient quantity to the front-axle brake circuits I, II from the pump 18 directly through the non-return valves 23, 123 and the pressure chambers 74, 176, while the brake pedal 16 will remain in the position it has assumed at the moment of commutation of the switching valve 21.

The three-position two-way valve 33 maintains its function without change as described with reference to FIGS. 1, 2. Indeed, it acts only at the beginning of build-up of a controlled pressure until the brake shoes come to be applied. During this period, a wheel slip cannot normally occur. During this period, a wheel slip cannot normally occur. Thus, the three-position two-way valve 33 connects the annular chamber 22 and the pedal-retaining annular chamber 25 with the fluid reservoir 27 both when the brake is not being operated and upon application of the brake shoes.

Exclusively during the phase when the brake shoes are moved from their position of rest into the position of application, the three-position two-way valve 33 will shut off the annular chamber 22 from the fluid reservoir 27 in the way described with reference to FIG. 1, and the pedal-retaining annular chamber 25 all the same. Since according to the teachings of the invention less volume is absorbed by the pedal-retaining annular chamber 25 on a forward slide of the first mastor piston 24 than is displaced in the annular chamber 22, excess volume will advance in any case for the pressure chamber 76 to be filled more quickly.

If the auxiliary energy should fail during a wheel slip, for example due to a fault of the pump or a leakage in the supply lines, the non-return valves 23, 123 will close at once because of the missing input pressure and the pedal-retaining valve 26 will open, and the necessary pressure in the pressure chamber 76 could be built up by a further depression of the pedal 16 because, evidently, on account of the supply of pressure medium into the pressure chamber 76, the further forward slide of the master piston 24 was stopped at the moment of opening of the non-return valve 23.

If no fault of the pump or leakage occurs, and this is the normal case, the switching valve 21 will close again on the end of a wheel slippage, whereupon the change-over valves 34, 34' will open up the path to the fluid reservoir 27 and the non-return valves 23, 123 will close. The vehicle brake will not go on operating in the normal way.

As will be appreciated, the valves 26 and 33 work during entirely different operating phases, namely the pedal-retaining valve 26 at each wheel slip-brake control action and the three-position two-way valve 33 at the application of the brake shoes, when a wheel slippage cannot occur.

What is claimed is:

1. A hydraulic servo vehicle brake with a pedal-actuated tandem master cylinder having two master pistons, with wheel cylinders linked to it through at least one brake circuit, and with a brake application valve which is arranged between the pedal and a first master piston and which, on actuation by the brake pedal, applies pressure medium supplied by a hydraulic pump connected with a fluid reservoir in a controlled manner to the first master piston and directly to said brake circuit to furnish a controlled pressure, wherein said first master piston (24) is provided with a cylindrical axial bore (78) toward the piston pressure chamber (76) within which axial bore (78) a second master piston (80) extending to a bottom (79) of the master cylinder is tightly slidably arranged, a non-return valve (23) arranged as a sealing cup is provided between the second master piston (80) and the annular portion (24''') of a piston (24) wherein an annular chamber (22) existing between that portion of said second master piston (80) which projects from the said axial bore (78) and said master cylinder (11) is lined with a three-position two-way valve (33) having an inlet (37) and an outlet (36) and being controlled by the controlled pressure by way of a control inlet (116), and which with no application of controlled pressure links said annular chamber (22) to said fluid reservoir (27) and which interrupts that link in the presence of a slight first controlled pressure on the order of approximately 1 bar, and wherein the interrupted condition is maintained until application of brake shoes of said vehicle brake takes places as long as the controlled pressure is still relatively low in the amount of up to approximately 7 bar, and which again opens in response to increased second controlled pressure when the increased pressure exceeds approximately 7 bar.

2. A vehicle brake as claimed in claim 1, wherein said outlet (36) of said three-position two-way valve (33) is directly connected with said fluid reservoir (27).

3. A vehicle brake as claimed in claim 1, with a wheel slip-brake control unit which, in the event of incipient slip of one single or several vehicle wheels, automatically reduces the brake power at the relevant vehicle wheels to a value still just enabling the wheels to rotate and which comprises a switching valve which is also subjected to the controlled pressure and is normally closed and opens at incipient slip of one or several vehicle wheels in order to apply the controlled pressure to the master cylinder from where the pressure medium is conveyed, through two non-return valves, to pressure chambers positioned behind the master pistons, to which pressure chambers the brake circuits are linked, wherein said outlet (36) of said three-position two-way valve (33) is connected, through a hydraulic line (35), with a change-over valve (34) upon which said switching valve (2) acts and which links said three-position two-way valve (33) to said fluid reservoir (27) when the said switching valve (21) is closed and is changed over by the controlled pressure when said switching valve (21) is open and applies the controlled pressure, through said change-over valve (34), to said outlet (36) of said three-position two-way valve (33).

4. A vehicle brake as claimed in claim 3, wherein said first master piston (24) succeeding the said brake application valve (17) is extended as said master cylinder (11) in a stepped configuration in the direction of the associated piston pressure chamber (76), and wherein the pedal-retaining annular chamber (25) in normal condition is linked to said inlet (37) of said three-position two-way valve (33) through a pedal-retaining valve (26) controlled by the said switching valve (21) and is shut off from the atmosphere by said pedal-retaining valve (26) in the event of a wheel slip.

5. A vehicle brake as claimed in claim 1, wherein said three-position two-way valve (33) is furnished with an actuating piston (38) which acts upon a closing plate (40) through a first spring (39) in the direction of closure and through a push rod (41) upon a valve cone (43) positioned in an opening (42) of said closing plate (40) in the direction of opening, said inlet (37) being provided on the side of said valve cone (43) and said outlet (36) on the side of the said closing plate (40).

6. A vehicle brake as claimed in claim 5, wherein said actuating piston (38) with said spring (39), said closing plate (40), said push rod (41) and said valve cone (43) are preloaded in the direction of opening by a weak second spring (44) determining said slight first pressure and wherein the difference of the forces of the second and first springs (44,39) corresponds to the second pressure.

7. A vehicle brake as claimed in claim 1, wherein a change-over valve (34) is provided with a piston (64) which is furnished with an opening (65) and is subjected to the force of a return spring (69) contrasting the pressure applied to said piston (64) and in which a closing push rod (66) with a closing plate (66') is arranged which is opposed by an outlet port (67) and closes said outlet port (67) when in abutment therewith, said closing push rod (66) interacting, with its other end, with a valve (68) closing the said opening (65) in said piston (64), so that upon the closure of said outlet port (67), said closing push rod (66) opens said valve (68) when the said piston (64) moves further, with an inlet port (70) being connected to the controlled pressure, said outlet port (67) to the said fluid reservoir (27), and a chamber (71) between the said piston (64) and said outlet port (67), through a connecting port (72) and to the outlet of the said three-position two-way valve (33).

* * * * *